US008195763B2

(12) United States Patent
Knowles et al.

(10) Patent No.: US 8,195,763 B2
(45) Date of Patent: Jun. 5, 2012

(54) SECURE METHOD OF SYNCHRONIZING CACHE CONTENTS OF A MOBILE BROWSER WITH A SERVER

(75) Inventors: Michael Knowles, Waterloo (CA); David Tapuska, Waterloo (CA); Tatiana Kalougina, Waterloo (CA)

(73) Assignee: Research In Motion Limited, Waterloo, Ontario ( * ) Notice: Subject to any disclaimer, the term of this patent is extended or adjusted under 35 U.S.C. 154(b) by 1404 days.

(21) Appl. No.: 11/490,495

(22) Filed: Jul. 21, 2006

(65) Prior Publication Data

US 2007/0180125 A1 Aug. 2, 2007

(30) Foreign Application Priority Data

Jul. 22, 2005 (CA) ...................................... 2513016

(51) Int. Cl.
*G06F 15/16* (2006.01)
(52) U.S. Cl. .................. 709/217; 709/218; 709/219
(58) Field of Classification Search .................. 709/217, 709/206, 218, 223, 219; 370/338
See application file for complete search history.

(56) References Cited

U.S. PATENT DOCUMENTS

| | | | |
|---|---|---|---|
| 5,864,837 A | 1/1999 | Maimone | |
| 6,041,357 A * | 3/2000 | Kunzelman et al. | 709/228 |
| 6,055,569 A | 4/2000 | O'Brien et al. | |
| 6,061,794 A * | 5/2000 | Angelo et al. | 726/3 |
| 6,115,754 A | 9/2000 | Landgren | |
| 6,233,318 B1 * | 5/2001 | Picard et al. | 379/88.17 |
| 6,286,032 B1 | 9/2001 | Oberlander et al. | |
| 6,341,316 B1 | 1/2002 | Kloba et al. | |
| 6,393,468 B1 | 5/2002 | McGee | |
| 6,415,276 B1 | 7/2002 | Heger et al. | |
| 6,615,267 B1 | 9/2003 | Zabolotzky et al. | |
| 6,813,690 B1 | 11/2004 | Lango et al. | |
| 6,950,863 B1 | 9/2005 | Pham et al. | |

(Continued)

FOREIGN PATENT DOCUMENTS

CA 2379082 A1 9/2003

(Continued)

OTHER PUBLICATIONS

May, Michael, Jun. 19, 2008, Supplementary European Search Report.

(Continued)

*Primary Examiner* — Ian N Moore
*Assistant Examiner* — Stephanie Chang
(74) *Attorney, Agent, or Firm* — Perry + Currier

(57) ABSTRACT

A method of securely synchronizing cache contents of a mobile browser with a server includes initiating a session between the browser and server, including transmission of browser state information regarding the cache contents and an authentication key to the server; maintaining a record of data sent from the server to the browser for storage in the cache; maintaining a record of the state information regarding the cache contents transmitted from the browser to the server; and transmitting data requests from the browser to the server, in response to which the server uses the key as a seed generation function and accesses each the record of data and returns only data that does not already form part of the cache contents, and wherein the data includes a result of a hash of data generated by the generation function for authentication by the browser before updating the cache contents with the data.

4 Claims, 4 Drawing Sheets

U.S. PATENT DOCUMENTS

| | | | |
|---|---|---|---|
| 7,000,032 | B2 | 2/2006 | Kloba et al. |
| 7,092,370 | B2 | 8/2006 | Jiang et al. |
| 7,330,883 | B1 | 2/2008 | Jessup et al. |
| 7,383,389 | B1 | 6/2008 | Bumbulis |
| 2001/0027450 | A1 | 10/2001 | Shinoda et al. |
| 2002/0002627 | A1 | 1/2002 | Stead et al. |
| 2002/0004813 | A1 | 1/2002 | Agrawal et al. |
| 2002/0042920 | A1 | 4/2002 | Thomas et al. |
| 2002/0052916 | A1 | 5/2002 | Kloba et al. |
| 2002/0107935 | A1 | 8/2002 | Lowery et al. |
| 2002/0138551 | A1* | 9/2002 | Erickson ............ 709/203 |
| 2002/0160790 | A1 | 10/2002 | Schwartz et al. |
| 2003/0074425 | A1* | 4/2003 | Kawakita ............ 709/219 |
| 2003/0079039 | A1 | 4/2003 | Forkner et al. |
| 2003/0088421 | A1* | 5/2003 | Maes et al. ............ 704/270.1 |
| 2003/0088580 | A1 | 5/2003 | Desai et al. |
| 2003/0110266 | A1 | 6/2003 | Rollins et al. |
| 2003/0112772 | A1* | 6/2003 | Chatterjee et al. ............ 370/316 |
| 2003/0120647 | A1 | 6/2003 | Aiken et al. |
| 2003/0177194 | A1 | 9/2003 | Crocker et al. |
| 2003/0202649 | A1 | 10/2003 | Haug, Jr. et al. |
| 2004/0073626 | A1* | 4/2004 | Major et al. ............ 709/217 |
| 2004/0117486 | A1 | 6/2004 | Bourne et al. |
| 2004/0162885 | A1 | 8/2004 | Garg et al. |
| 2004/0203670 | A1 | 10/2004 | King et al. |
| 2004/0220975 | A1 | 11/2004 | Carpentier et al. |
| 2004/0248558 | A1 | 12/2004 | Chandhok |
| 2004/0249824 | A1 | 12/2004 | Brockway et al. |
| 2005/0060498 | A1 | 3/2005 | Curtis |
| 2005/0065950 | A1* | 3/2005 | Chaganti et al. ............ 707/100 |
| 2005/0076087 | A1* | 4/2005 | Budd et al. ............ 709/206 |
| 2005/0094782 | A1 | 5/2005 | Kim |
| 2005/0117558 | A1 | 6/2005 | Angermann et al. |
| 2005/0138176 | A1 | 6/2005 | Singh et al. |
| 2005/0144439 | A1 | 6/2005 | Park et al. |
| 2006/0036754 | A1 | 2/2006 | Itoh et al. |
| 2006/0056415 | A1 | 3/2006 | Lee et al. |
| 2006/0218402 | A1 | 9/2006 | Kerstens et al. |
| 2006/0251047 | A1 | 11/2006 | Shenfield et al. |
| 2007/0150524 | A1 | 6/2007 | Eker et al. |
| 2007/0156852 | A1 | 7/2007 | Sundarrajan et al. |
| 2008/0134018 | A1 | 6/2008 | Kembel et al. |

FOREIGN PATENT DOCUMENTS

| | | |
|---|---|---|
| EP | 1154356 | 11/2001 |
| EP | 1202585 A | 5/2002 |
| EP | 1441470 A1 | 7/2004 |
| WO | 99/17227 A2 | 4/1999 |
| WO | 0161438 A | 8/2001 |
| WO | 03088566 A | 10/2003 |

OTHER PUBLICATIONS

William H. Collins of Ericsson et al.: "Method of recognizing duplicates in received information" Research Disclosure, Mason Publications, Hampshire, GB, vol. 440, No. 45, Dec. 1, 2000, XP007127230 ISSN: 0374-4353.

GloMop: Global Mobile Computing by Proxy, GloMop Group, Sep. 13, 1995, pp. 1-12.

Kahol et al.: "A Strategy to Manage Cache Consistency in a Disconnected Distributed Environment" [Online] Jul. 2001, p. 686-700, XP002501708. Retrieved from the Internet: URL:http://ieeexplore.ieee.org/stamp/stamp.jsp? arnumber=00940744>.

European Search Report of EP 06 76 1162 dated Oct. 31, 2008.

European Search Report of EP 06 76 1166 dated Aug. 21, 2008.

"Wireless markup language specification version 1.1", Internet Citation, [Online] XP002161009 Retrieved from the Internet URL:http://www1.wapforum.org/tech/documents/SPEC-WML1-19990616.pdf.

Jesse Anton et al: "Web Caching for Database Applications With Oracle Web Cache" ACM Proceedings of SIGMOD. International Conference on Management of Data, XX, XX, Jun. 4, 2002, pp. 594-599, XP001152240 ISBN: 978-1-58113-497-1.

European Patent Application No. 06761164.0 Supplementary Search Report dated Dec. 14, 2009.

Zhu et al.: "Using Markov Models for Web site Link Prediction" Proceedings of the Thirteenth ACM conference on Hypertext and Hypermedia, [online] Jun. 11, 2002-Jun. 15, 2002; pp. 169-170, XP002559093.

Ibrahim T. I. et al: "Neural nets based predictive prefetching to tolerate WWW latency" Distributed Computing Systems, 2000. Proceedings. 20th International Conference on Taipei, Taiwan Apr. 10-13, 2000, Los Alamitos, CA, USA, IEEE Comput. Soc, US, Apr. 10, 2000, pp. 636-643, XP010379077, ISBN: 978-0/7695-0601-2.

Loon T. S. et al.: "Alleviating the latency and bandwidth problems in WWW browsing" Proceedings of the USENIX Symposium on Internet Technologies and Systems, XX, XX, Dec. 8, 1997, pp. 219-230, XP002109263.

European Patent Application No. 06761161.6 Supplementary Search Report dated Dec. 22, 2009.

"Optimizing Web Delivery Over Wireless Links: Design, Implementation, and Experiences". Rajiv Chakravorty, Andrew Clark and Ian Pratt. IEEE Journal on Selected Areas in Communications, vol. 23, No. 2, Feb. 2005 pp. 402-416.

"The Design and Implementation of the FreeBSD Operting System" Marshall Kirk McKusick; Geroge V. Neville-Neil. Published by: Addison-Welsey Professional. ISBN-13: 978-0-201-70245-3, Published: Aug. 2, 2004.

"Wireless markup language specification version 1.1", Internet Citation, [Online] XP002161009 Retrieved from the Internet URL:http://www1.wapforum.org/tech/documents/SPEC-WML-19990616.pdf, Jun. 16, 1999.

Jiun-Long Huang, et al: "A QoS-aware transcoding proxy using on-demand data broadcasting" INFOCOM 2004. Twenty-Third Annual Joint Conference of the IEEE Computer and Communications Societies, IEEE, Piscataway, NJ, USA, vol. 3, Mar. 7, 2004. XP010740561.

Supplementary European Search Report of Jan. 14, 2009.

* cited by examiner

SECURE METHOD OF SYNCHRONIZING CACHE CONTENTS OF A MOBILE BROWSER WITH A SERVER

COPYRIGHT NOTICE

A portion of this specification contains material that is subject to copyright protection. The copyright owner has no objection to the facsimile reproduction by anyone of the patent document, as it appears in the Patent and Trademark Office patent file or records, but otherwise reserves all copyrights whatsoever.

FIELD

This specification relates generally to mobile data communication systems, and more particularly to a method for securely synchronizing cache contents of a mobile Internet browser with a proxy server.

BACKGROUND

Mobile communication devices are becoming increasingly popular for business and personal use due to a relatively recent increase in number of services and features that the devices and mobile infrastructures support. Handheld mobile communication devices, sometimes referred to as mobile stations, are essentially portable computers having wireless capability, and come in various forms. These include Personal Digital Assistants (PDAs), cellular phones and smart phones.

It is known in the art to provide Internet browser functionality in such mobile communication devices. In operation, a browser user-agent in the handheld mobile communication device issues commands to an enterprise or proxy server implementing a Mobile Data Service (MDS), which functions as an acceleration server for browsing the Internet and transmitting text and images to the mobile device for display. Such enterprise or proxy servers generally do not store the state of their clients (i.e. the browser user-agent), or if they do, the state that is stored is minimal and limited to HTTP state (i.e. cookies). Typically, such enterprise or proxy servers fetch and transmit data to the browser user-agent when the browser makes a data request. In order to improve the performance of the browser on the mobile device, some enterprise or proxy servers fetch all the data required in order to fulfill the data request from the browser, aggregate the fetched data, and transmit the data to the device browser. For instance, if a HyperText Markup Language (HTML) page is requested, the enterprise or proxy server fetches any additional files referenced within the HTML page (e.g. Images, inline CSS code, JavaScript, etc.). Since the proxy server fetches all the additional files within the HTML file, the device does not have to make additional data requests to retrieve these additional files. Although this methodology is faster than having the device make multiple requests, the proxy server nonetheless has to send all of the data again if the site is later revisited. This is because the proxy server has no knowledge of the device caches (e.g. caches that are saved in persistent memory, for different types of data such as a content cache to store raw data that is cached as a result of normal browser activity, a channel cache containing data that is sent to the device by a channel or cache push, and a cookie cache containing cookies that are assigned to the browser by visited Web pages). For example, if a user browses to CNN.com, closes the browser to perform some other function (e.g. place a telephone call or access e-mail messages, etc.) and then later accesses the CNN.com Web site (or follows a link from CNN.com to a news story), the banner "CNN.com" will be transmitted from the MDS to the device browser each time the site is accessed, thereby consuming significant bandwidth, introducing delay, etc.

It is known in the art to provide local file caching. One approach is set forth in *GloMop: Global Mobile Computing By Proxy*, published Sep. 13, 1995, by the GloMop Group, wherein PC Card hard drives are used as portable file caches for storing, as an example, all of the users' email and Web caches. The user synchronizes the file caches and the proxy server keeps track of the contents. Mobile applications (clients) are able to check the file caches before asking for information from the proxy server by having the server verify that the local version of a given file is current.

BRIEF DESCRIPTION OF THE DRAWINGS

A detailed description of the preferred embodiment is set forth in detail below, with reference to the following drawings, in which.

DETAILED DESCRIPTION

Figure 1:
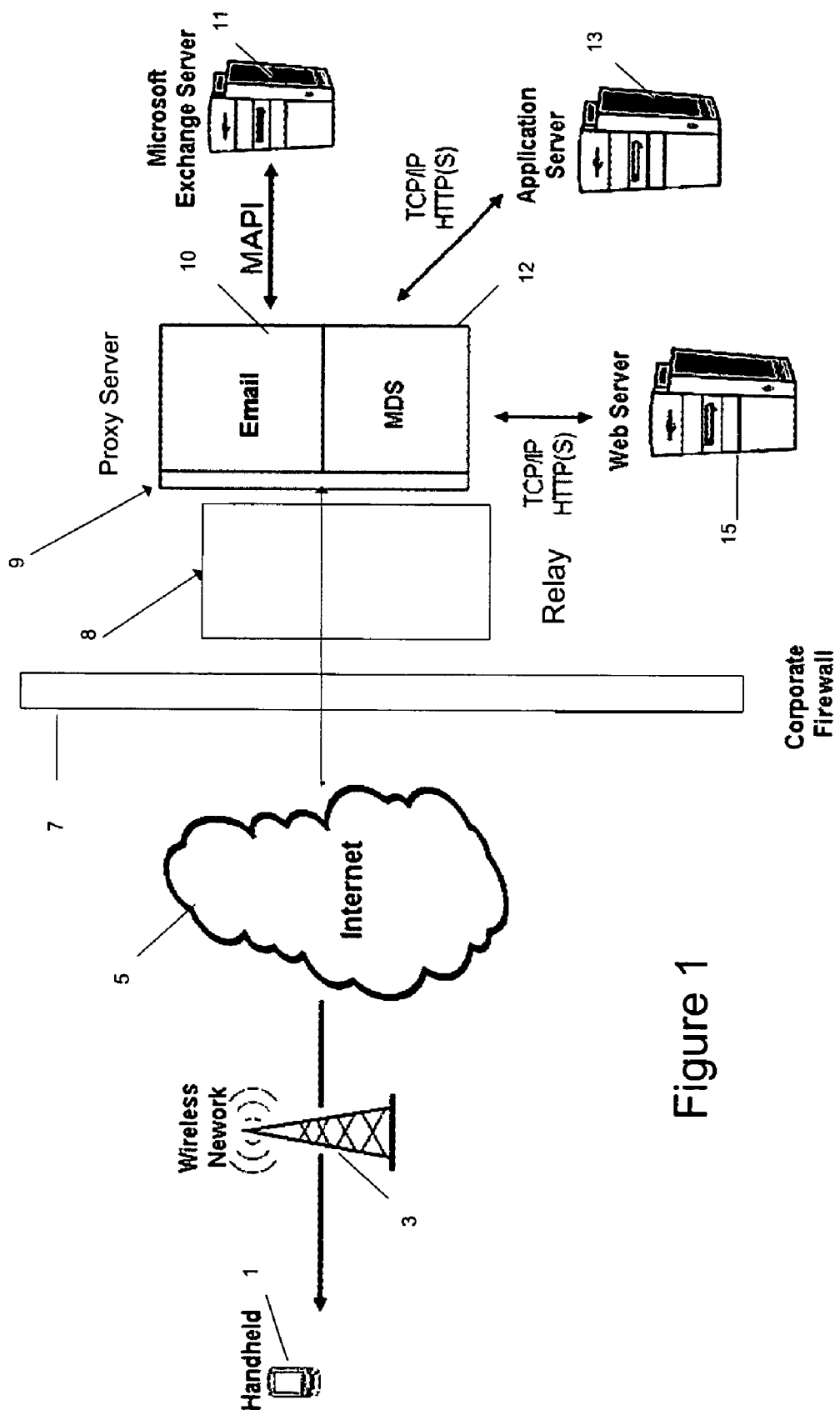
FIG. 1 is a block diagram of a communication system for implementing Internet browsing functionality in a mobile communication device.

In general, there is provided a secure method of synchronizing cache contents of a mobile browser with a server, comprising initiating a session between the browser and server, including transmission of browser state information regarding the cache contents and an authentication key to the server, maintaining a record of data sent from the server to the browser for storage in the cache, maintaining a record of the state information regarding the cache contents transmitted from the browser to the server; and transmitting data requests from the browser to the server, in response to which the server uses the authentication key to generate a message authentication code that includes a cryptographic hash of data, and accesses each record of data and returns only data that does not already form part of the cache contents, and wherein the returned data includes a result of a hash of data generated using the authentication key for authentication by the browser before updating the cache contents with the data.

The method set forth herein has specific application to a secure system for communicating information between an enterprise or proxy server and a mobile Internet browser using an HTTP-like protocol, referred to herein as the Browser Session Management (BSM) protocol, that provides a control channel between the proxy server and the mobile device browser, so that the mobile device browser can communicate to the proxy server what data the mobile device browser has cached (from previous browsing). The BSM protocol is an "out of band" protocol in that BSM communications are in addition to the usual stream of HTTP requests from the mobile device browser to the proxy server, and provides "metadata" relating to cache contents. This metadata is used by the proxy server when handling subsequent requests from the mobile device browser, to determine what data to send to the mobile device browser, thereby significantly reducing data transfer on subsequent requests relative to the prior art methodology discussed above.

Because the proxy server is aware of what the mobile device browser has stored in its cache, the amount of data sent to the mobile device browser may be reduced, thereby increasing the performance of the mobile device browser and reducing operational cost. For example, if after the first request the CNN.com banner is cached and if the proxy server "knows" that the information has been cached then there will be no need to send the CNN.com banner to the mobile device browser upon subsequent visits to the CNN web site.

According to another aspect, messages from the device to the proxy server contain hash values of different portions of documents (rather than the actual URLs) which are used by the proxy server to detect state changes in the device and utilize the information in preparing documents for transmission to the device. In another embodiment, the device sends hashes of the actual data of the portions (i.e. the actual image data, JavaScripts, StyleSheets, etc.) and the proxy server compares the received and stored data hashes for the portions to determine if the device already has the data for a particular portion (e.g. previously retrieved with a different URL), in which case the proxy server sends a response to the device with a header that indicates the device already has the data that is to be used for that portion. A person of skill in the art will appreciate that a one-way hash function transforms data into a value of fixed length (hash value) that represents the original data. Ideally, the hash function is constructed so that two sets of data will rarely generate the same hash value. Examples of known hash functions include MD2, MD5 and SHA-1.

According to another aspect, each component of the document downloaded from the server is authenticated by the device before adding such portion of the document to the device cache. This prevents a third party from creating its own document or document portion, such as an image, sub-frame or JavaScript, and sending it to the device for injecting cache entries that could be used to extract personal information from the user.

In contrast to the prior art GloMop caching methodology discussed above, the exemplary method set forth herein synchronizes the cache contents when the mobile device browser connects to the proxy server in order to initiate a session and keeps track of changes to the cache via knowledge of what data has been sent to the mobile device browser in combination with state information periodically received from the mobile device browser identifying what has actually been cached. Also, as set forth in greater detail below, the proxy server uses this cache knowledge to determine what to send back to the mobile device browser. In contrast, the prior art GloMop methodology does not contemplate sending any state information to the proxy server for identifying what has actually been cached in the device. Moreover, the prior art GloMop approach first checks the local cache, and then queries the proxy server to determine whether a particular data item in the cache is current or not. According to the GloMop prior art, the proxy server does not use its own knowledge of the mobile device browser cache to determine what to send back to the mobile device browser.

Additional aspects and advantages will be apparent to a person of ordinary skill in the art, residing in the details of construction and operation as more fully hereinafter described and claimed, reference being had to the accompanying drawings.

FIG. 1 depicts the architecture of a system for providing wireless e-mail and data communication between a mobile device 1 and an enterprise or proxy server 9. Communication with the device 1 is effected over a wireless network 3, which in turn is connected to the Internet 5 and proxy server 9 through corporate firewall 7 and relay 8. Alternatively, the device 1 can connect directly (via the Internet) through the corporate firewall 7 to the proxy server 9. When a new message is received in a user's mailbox within email server 11, enterprise or proxy server 9 is notified of the new message and email application 10 (e.g. Messaging Application Programming Interface (MAPI), MS Exchange, etc.) copies the message out to the device 1 using a push-based operation. Alternatively, an exemplary architecture for proxy server 9 may provide a browsing proxy but no email application 10. Indeed, the exemplary embodiment set forth herein relates to mobile browser device functionality and is not related to email functionality. Proxy server 9 also provides access to data on an application server 13 and the Web server 15 via a Mobile Data Service (MDS) 12. Additional details regarding e-mail messaging, MAPI sessions, attachment service, etc., are omitted from this description as they are not germane. Nonetheless, such details would be known to persons of ordinary skill in the art.

Figure 2A:
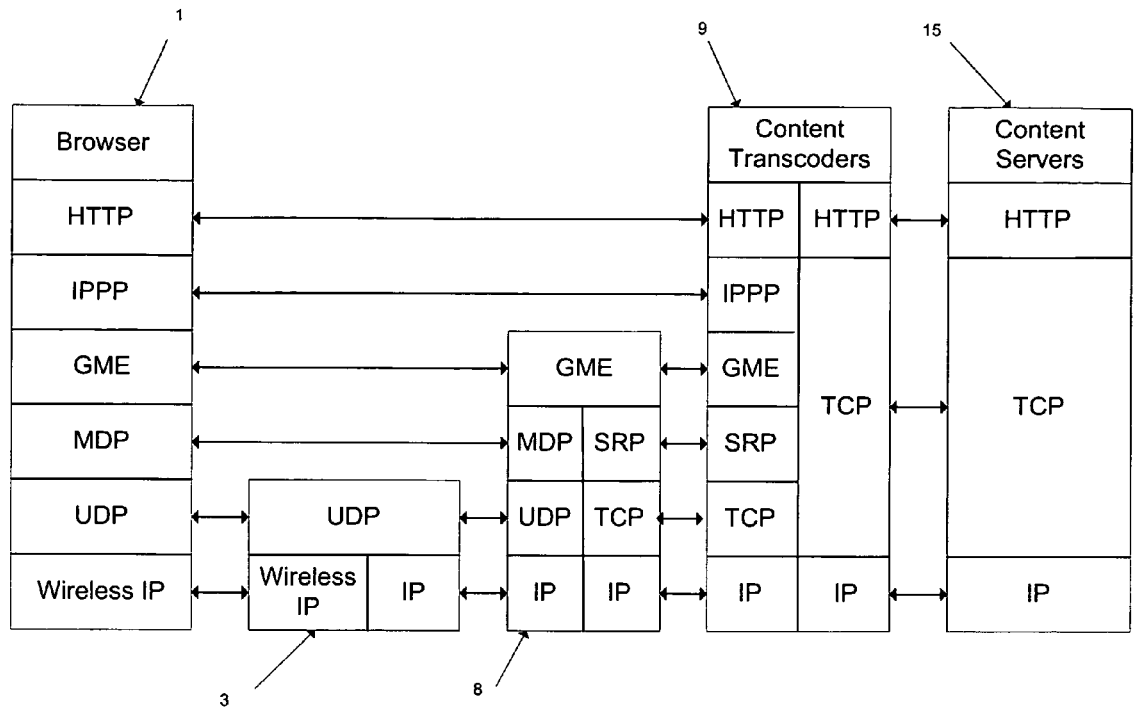
FIG. 2A shows communication protocol stacks for the communication system of FIG. 1.

In terms of Web browsing functionality, the device 1 communicates with enterprise or proxy server 9 using HTTP over an IP protocol optimized for mobile environments. In some embodiments, the device 1 communicates with the proxy server 9 using HTTP over TCP/IP, over a variant of TCP/IP optimized for mobile use (e.g. Wireless Profiled TCP), or over other, proprietary protocols. For example, according to the communications protocol of FIG. 2A, HTTP is run over Internet Point-to-Point Protocol (IPPP) and an encrypted Global Messaging Exchange (GME) channel over which datagrams are exchanged to transport data between the device 1 and proxy server 9. The GME datagrams are 64Kbit in size whereas the wireless network 3 can only transport UDP datagrams with payloads up to 1500 bytes. Therefore, a Message Delivery Protocol (MDP) is used to separate the GME datagrams into one or more MDP packets, each of which is less than 1500 bytes (default size 1300 bytes), which are transported over UDP/IP to and from the relay 8 which, in turn communicates with the proxy server 9 via Server Relay Protocol (SRP)/TCP/IP. The MDP protocol includes acknowledgements, timeouts and re-sends to ensure that all packets of the GME datagram are received.

The communication between the device 1 and proxy server 9 is optionally encrypted with an encryption scheme, such as Triple Data Encryption Algorithm (TDEA, formerly referred to as Triple Data Encryption Standard (Triple DES)), as is known in the art. The proxy server 9 enables Internet access, preprocesses and compresses HTML and XML content from the Web server 15 before sending it to the device 1, transcodes content type, stores HTTP cookies on behalf of the device 1, and supports certificate authority authentications, etc.

In response to a request from the device browser, the proxy server 9 retrieves content from Web server 15 and creates a custom document containing both images to be displayed on the device and data in the form of compressed versions of requested portions of the document. The document is preferably of "multi-part" format to improve transmission to and processing efficiency within the device 1. Specifically, in order to display composite Web pages (i.e. pages composed of a main WML or HTML page and one or more related auxiliary files, such as style sheets, JavaScript files, or image files) the device browser is normally required to send multiple HTTP requests to the proxy server 9. However, according to the multi-part generation feature, the proxy server 9 posts all necessary parts of a composite Web page in a single bundle, enabling the browser to download all the required content with a single request. The header in the server response identifies the content as a multi-part bundle (e.g. Multi-Purpose Mail Extensions (MIME)/multipart, as defined by RFC 2112, E. Levinson, March 1997).

Figure 2B:
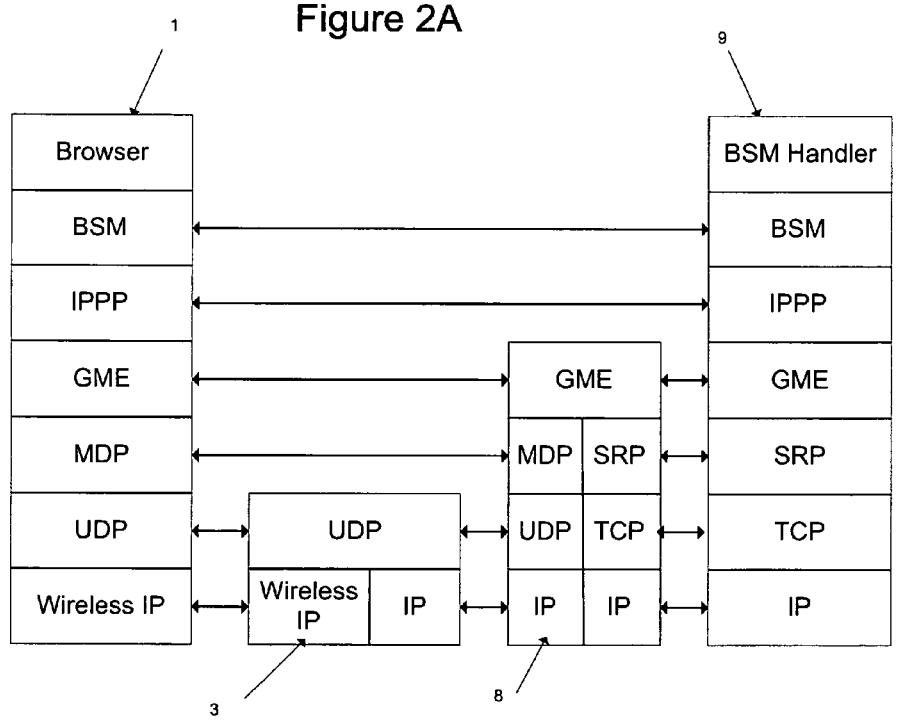
FIG. 2B shows communication protocol stacks for a Browser Session Management (BSM) protocol according to an exemplary embodiment.

In order to indicate device browser state information to the proxy server 9, three transitional state messages are defined herein, as follows: CONNECT, UPDATE and DISCONNECT, each of which conforms to the exemplary BSM protocol. As shown in FIG. 2B, the BSM communications protocol is identical to the protocol of FIG. 2A except that the conventional HTTP layer of the protocol stack is replaced by an HTTP-like BSM layer.

The CONNECT transitional message creates a new session with a connection identifier carried in the payload, device information and state data (e.g. current cache and device information) in the form of a set of hash functions for use by the proxy server 9 in preparing a response. Specific care is taken not to identify to the proxy server 9 what cookies or cache entries are contained on the device 1. Only hash values of the state data are sent to the proxy server 9 in order to protect the identity of state data on the device 1.

The CONNECT message also contains a unique authentication key for generating a MAC (Message Authentication Code) using a Hash Message Authentication Code (HMAC) algorithm that incorporates a cryptographic hash function in combination with the authentication key. Each portion of a multi-part document from the proxy server 9 also contains an HMAC, generated using the authentication key, that is used for authenticating the proxy server 9 before adding that portion to the device cache. This prevents a third party from creating its own multi-part document and sending it to the device 1 for injecting cache entries that could be used to extract personal information from the user.

Upon receipt of the CONNECT message, the proxy server 9 uses the state information to regulate or control the transmission of content retrieved from Web server 15 (step 23) to the device 1. One example of an application where this information can be used is when the proxy server 9 is pre-fetching images, inline Cascading Style Sheets (CSS), JavaScript, and the like for an HTML document. If the proxy server 9 already knows that the device 1 has the image, inline CSS, or JavaScript document, there is no need for resending the documents.

The UPDATE transition message notifies the proxy server 9 of changes that have occurred on the device 1 since the last CONNECT message or the last UPDATE message, between the device 1 and proxy server 9 (e.g. new cache entries added because of a push, or invoking the "Low Memory Manager" (LMM) or other memory-space preservation policies on the device and purging items from the cache).

The DISCONNECT transition message notifies the proxy server 9 that the device 1 will no longer send any more messages using the connection identifier specified in the payload. The proxy server 9 can then de-allocate any memory reserved for the connect session between the device 1 and proxy server 9. Upon receiving the disconnect message, the proxy server 9 deletes any session cookies for the device 1 (if it is processing cookies) along with state information. Receiving a request on the identified connection after the DISCONNECT has been received, and before any subsequent CONNECT message has been received, is defined as an error.

Since state is indicated from the device 1 to the proxy server 9, and state may be stored in transient memory within proxy server 9, a mechanism is provided for the proxy server 9 to return to the device 1 a message indicating that the session the device is trying to use is not valid. Once this occurs, the device 1 issues a new CONNECT message and establishes a new session with the proxy server 9, and re-issues the original request.

The data protocol set forth herein is similar to HTTP in order to reduce complexity and to reuse code that already exists for the HTTP protocol. Thus, data transmission according to this protocol begins with a STATE keyword; followed by a BSM (Browser Session Management) protocol identifier and a "Content-Length" header. The end of the "headers" is indicated by a double CRLF (a sequence of control characters consisting of a carriage return (CR) and a line feed (LF)), much like HTTP. After the double CRLF pair (i.e. \r\n) a WBXML (WAP Binary Extensible Markup Language) encoded document is inserted as the message payload. The WBXML document is later decoded using a DTD (Document Type Definition) and codebook, as discussed in greater detail below. The indication of the protocol version refers to what version of the DTD to validate the request against (ie. BSM/1.1 stipulates using version 1.1 of the DTD). It should be noted that WBXML encoding of the contents of BSM messages is set forth to allow for more efficient processing of the BSM message at the device 1, but that in alternate embodiments, the BSM message may be formatted as normal (textual) XML.

The following is an example communication using the protocol according to the preferred embodiment:

```
CONNECT BSM/1.0\r\n
Content-Length: 40\r\n
\r\n
<WBXML Encoded document of length 40 bytes>
BSM/1.0 200\r\n
r\n
```

In the foregoing, the first four lines form the CONNECT message from the device 1 to the proxy server 9, and the last two lines are the response from the proxy server 9.

An exemplary XML document, is as follows:

```
<?xml version="1.0"?>
<!DOCTYPE bsm PUBLIC "-// DTD BSM 1.0//EN"
     "http://www.something.com/go/mobile/BSM/bsm_1.0.xml">
<bsm id="2" hmac="12345678901234567890">
<cache>
<size>123012</size>
<entry urlHash="FEEDDEED01" dataHash="FDDEDEED11"
etag="SomeEtag"
expiry="256712323"/>
</cache>
<device>
<version>4.0.1.123</version>
<memfree>12342342</memfree>
</device>
</bsm>
```

Figure 3:
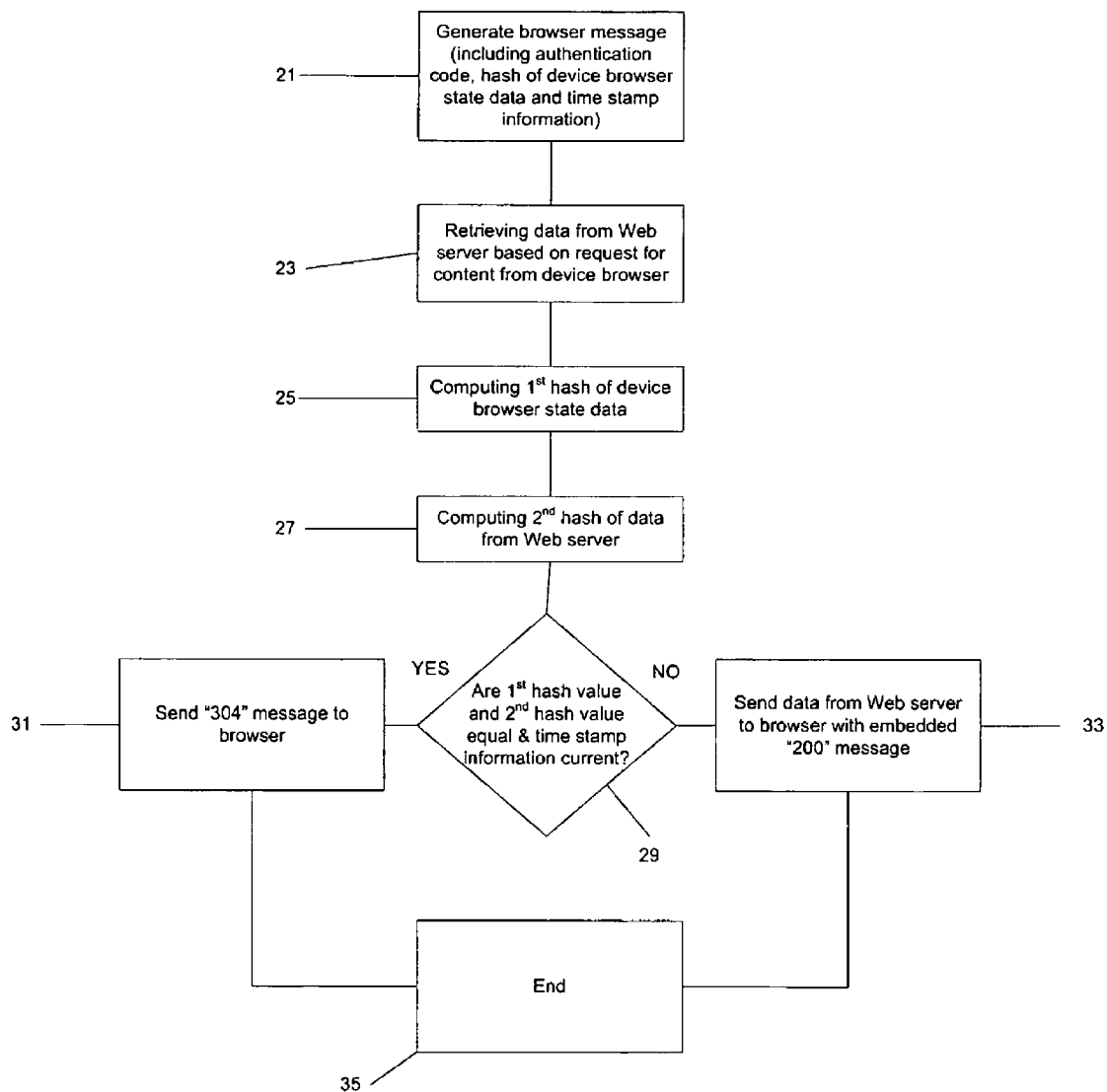
FIG. 3 is a flowchart showing the method for communicating information between a proxy server and a mobile Internet browser, according to the preferred embodiment.

In the example, the state data includes the URL of an HTML page within the device cache. It will be noted that the XML document payload includes a connection identifier (i.e. bsm id="2"), a value indicating when the document was last modified (i.e. etag="SomeEtag"), a page expiry (i.e. expiry="256712323"), and hash values for a URL (i.e. entry urlHash="FEEDDEED01") and a data attribute (i.e. entry dataHash="FDDEDEED11") rather than transmitting the actual URL and data attribute themselves. Thus, as shown in FIG. 3, the hashes of the URL and data attribute of the cached page are sent to the proxy server 9 in the CONNECT string (step 21). The proxy server 9 then fetches the requested page from Web server 13 (step 23), computes hashes of device browser state data (step 25) and data from the Web server 13 (step 27), and compares the hashes of the URL and data attribute of the requested page with the hashed URL and data attribute of the cached page, and also compares the time stamps/expiration information (step 29) in order to determine whether the cached page is current. Specifically, in response to the proxy server 9 retrieving a portion from the Web server 13, it computes the dataHash and urlHash of that portion and performs a comparison to the dataHashes and urlHashes of the entries it has saved. There are three cases.

In the first case, if both the dataHash and the urlHash of the retrieved portion match the dataHash and urlHash of a cache entry that the proxy server 9 knows the device 1 has, then the server 13 simply omits this portion from the response, as the device 1 still has a valid entry in its cache.

In the second case, if the dataHash of the retrieved portion matches the dataHash of a cache entry that the proxy server 9 knows the device 1 has, but the urlHash of the retrieved portion does not match the urlHash of that cache entry, the server 13 inlines this updated portion in the combined response to the device 1. However, because the dataHash matches a dataHash of an entry that already exists on the device 1, the inlined response does not include the actual data, but instead only includes a new HTTP header whose value is the new dataHash. When the device 1 receives this inlined portion, it detects the special header, looks for the cache entry with that dataHash, and either creates or updates its cache entry for that URL with the data corresponding to the dataHash by copying that data from the other cache entry (the cache for device 1 is modified to have two indexes, one to retrieve cache entries by URL, the other to retrieve cache entries by dataHash). Finally, if the proxy server 9 already has a cache entry for the urlHash, it updates that entry with the new dataHash; otherwise it creates a new entry for this portion.

In the third case, if the dataHash of the retrieved portion does not match the dataHash of any of the cache entries that the proxy server 9 has received from the device 1 in the BSM messages, then the server inlines the entire portion (headers and new data), since this portion has been updated and the device 1 does not contain the updated value anywhere in its cache.

Although not indicated in FIG. 3, it will be appreciated that each inline part to be added to a document to be displayed at the device 1 is fetched. If the response code from the proxy server indicates a "304" (step 31), then the part (i.e., the "304" response) is written as a block in the multipart document. On the other hand, if the proxy server 9 returns a "200" (step 33), then the hash compare operation is performed, and the portion is only included in the multipart document if the hash compare function indicates it is not already on the device 1.

An exemplary DTD, according to the preferred embodiment, is as follows:

```
<!ELEMENT   bsm (cache?, device)>
<!ATTLIST   bsm
            id      NMTOKEN    #REQUIRED
>
<!ELEMENT   cache (size, (entry)+)>
<!ATTLIST   cache
            action (add|remove|remove_all|quick_add) "add"
>
<!ELEMENT   entry EMPTY>
```

```
<!ATTLIST   entry
            urlHash        CDATA      #REQUIRED
            dataHash       CDATA      #REQUIRED
            etag           CDATA      #IMPLIED
            expiry         NMTOKEN    #IMPLIED
            size           NMTOKEN #IMPLIED
            last-modified  NMTOKEN #IMPLIED
>
<!ELEMENT   size (#PCDATA)>
<!ELEMENT   device (version, memfree)>
<!ELEMENT   version (#PCDATA)>
<!ELEMENT   memfree (#PCDATA)>
<!ELEMENT   hmac (#PCDATA)>
Element/Code
HMAC 12
Attribute/Code
size 9 (instead of action)
lastModified 10
actionAdd 11
actionRemove 12
actionRemoveAll 13
actionQuickAdd 14
```

Finally, an exemplary codebook, is as follows:

| Element | Code |
|---|---|
| Session | 5 |
| Cache | 6 |
| Size | 7 |
| Entry | 8 |
| Device | 9 |
| Version | 10 |
| MemFree | 11 |
| HMAC | 12 |

| Attribute | Code |
|---|---|
| Id | 5 |
| UrlHash | 6 |
| dataHash | 7 |
| ETag | 8 |
| Expiry | 9 |
| Action | 10 |

As is well known in the art, the codebook is used as a transformation for compressing the XML document to WBXML, wherein each text token is represented by a single byte from the codebook.

As discussed above, the proxy server 9 transmits multi-part documents in a proprietary format of compressed HTML, interspersed with data for images and other auxiliary files (which may or may not be related to the main HTML Web page). However, in a departure from conventional HTML, each document part may also include a response code (e.g. "200" for OK, or "304" for "not modified" to indicate that the specified document part has already been cached in the device 1). This may be used for selective downloading of document parts rather than entire documents and for indicating when a part (e.g. image) is about to expire. This is useful, for example, when one Web page links to another page containing one or more common elements.

Of course, certain device requests (e.g. page refresh) will always result in a full document download, irrespective of device state information stored in the proxy server 9.

It is contemplated that the inclusion of response codes may be used by heuristic processes within the proxy server 9 to learn user behaviour and modify downloading of documents based on tracking the history of certain changes reflected in the hash value (e.g. the server 9 may learn to download a certain page (e.g. CNN news) at a particular time each day based the user's history of issuing requests for that page at regular times. As discussed above, because the downloaded documents are multi-part and contain embedded response codes, only those portions of the document that have changed are actually downloaded.

Figure 4:
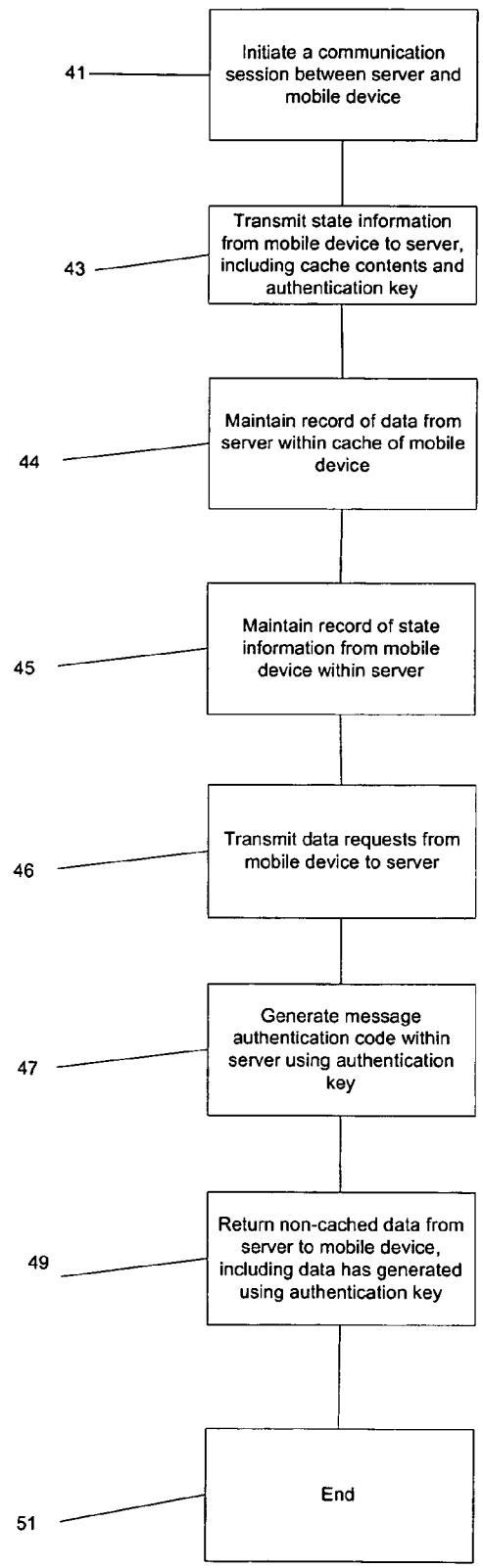
FIG. 4 is a flowchart of an exemplary method according to the present specification.

FIG. 4 illustrates a broad aspect of the exemplary method, wherein cache contents of the browser operating in mobile communication device 1 are securely synchronized with the proxy server 9. At step 41, a communication session is initiated between the mobile communication device 1 and proxy server 9. Browser state information is transmitted by the mobile communication device 1 to proxy server 9, including said cache contents and an authentication key (step 43). The mobile communication device 1 maintains in cache memory a record of data sent from the proxy server 9 (step 44). Similarly, the proxy server 9 maintains a record of the state information regarding the cache contents of mobile communication device 1 (step 45). The device 1 transmits data requests to the proxy server 9 (step 46), in response to which the proxy server 9 uses the authentication key to generate a message authentication code that includes a cryptographic hash of data (step 47). The proxy server 9 accesses each record of data and returns only data that does not already form part of mobile device cache contents. The returned data includes a result of a hash of data generated using the authentication key for authentication by the browser of mobile communication device 1 before updating the cache contents with the returned data. The method then ends (step 51).

As indicated above, the protocol of the preferred embodiment is preferably carried over a proprietary IPPP transport layer, but can also be easily adapted to run over TCP/IP on a specific port. The protocol is preferably implemented as a handler in the proxy server 9, thereby simplifying any currently existing protocol. (e.g. to avoid overloading a current HTTP protocol).

A person skilled in the art, having read this description of the preferred embodiment, may conceive of variations and alternative embodiments. For example, the conditional transfer of data based on communication of state information, as set forth above, may also be applied to separately transmitting individual portions of the multipart document as opposed to transmitting the entire document at once.

In some embodiments, the proxy server 9 uses heuristic algorithms to learn what additional data requests the device may make based on knowledge of the current request, and knowledge of past activity. In some instances, the device may follow a pattern of requesting a first Web page, and then a second Web page. For example, the device may first request the "cnn.com" Web page, and then request the "cnn.com/news" Web page. The proxy server 9 learns this pattern, and whenever the device requests the first Web page, the proxy server 9 determines that the device is likely to then request the second Web page. The proxy server 9 then fetches the second Web page, and uses its knowledge of the data cached on the device 1 (i.e. from the state information transferred to the proxy server 9 during initiation of the present connection) to determine whether the second Web page already exists within the data cached on the device. If so, the proxy server 9 includes information about the second Web page via response codes embedded within the response provided for the first Web page. If the device 1 requires the second Web page, then the device 1 can reference its cache and can avoid having to make a request to the proxy server 9 for the second Web page.

In other embodiments, heuristic processes within the proxy server 9 learn user behaviour and modify downloading of documents based on tracking the history of certain changes reflected in the hash value (e.g. the proxy server 9 may learn to download a certain page (e.g. CNN news) at a particular time each day based the user's history of issuing requests for that page at regular times). As discussed, because the downloaded documents are multi-part and contain embedded response codes, only those portions of the document that have changed are actually downloaded.

All such variations and alternative embodiments are believed to be within the ambit of the claims appended hereto.

What is claimed is:

1. A secure method of synchronizing cache contents stored in a cache memory of a mobile browser with a server, comprising:
    maintaining within said mobile browser a record of browser state information regarding said cache contents transmitted from the browser to said server;
    initiating a session between said browser and server, said session conforming to an out-of-band protocol, including transmission of said browser state information regarding said cache contents and an authentication key to said server, said browser state information being in the form of a hash value;
    maintaining within said server a record of data sent from the server to the browser for storage in said cache memory; and
    transmitting data requests from said browser to said server, in response to which said server uses said authentication key to generate a message authentication code that includes a cryptographic hash of data retrieved by said server from a web server, and accesses each said record of data and returns only that portion of said data retrieved by said server from said web server that does not already form part of said cache contents, and wherein returned data includes a result of a hash of said portion of said data retrieved by said server from said web server generated using said authentication key for authentication by said browser before updating the cache contents with said returned data;
    wherein said out-of-band protocol includes a transitional state message with payload including said hash of said cache contents and a connection identifier,
    for notifying the server of current state information for a current session between said browser and the server, and
    for notifying the server that the browser has ceased sending messages using said connection identifier; and
    wherein data transmission according to said out-of-band protocol comprises, in sequence: a header representing said transitional state message; a protocol identifier and a Content-Length header; a sequence of control characters; and an XML-encoded document containing said hash of said cache contents, said connection identifier and said browser state information.

2. The method of claim 1, wherein the transitional state message is for notifying the server of changes in state during said current session between said browser and the server.

3. The method of claim 1, wherein the server de-allocates stored memory for the session in response to being notified that the browser has ceased sending messages using said connection identifier.

4. A communication system for secure synchronizing of mobile browser cache contents with a server, comprising:
    cache memory within said mobile device for maintaining a record of data sent from the server to the browser;

a transmitter within said mobile device browser for initiating a session between said browser and server, said session conforming to an out-of-band protocol, and transmitting browser state information regarding contents of said cache memory and an authentication key to said server, said browser state information being in the form of a hash value;

memory within said server for maintaining a record of said state information regarding said cache contents transmitted from the browser to said server; and a processor within said server for receiving data requests from said browser and in response using said authentication key to generate a message authentication code that includes a cryptographic hash of data retrieved by said server from a web server, accessing each said record of data and returning to said mobile device browser only that portion of said data retrieved by said server from said web server that does not already form part of said cache contents, and wherein returned data includes a result of a hash of said portion of said data retrieved by said server from said web server generated by said authentication key for authentication by said browser before updating the cache contents with said data;

wherein said out-of-band protocol includes a transitional state message with payload including said hash of said cache contents and a connection identifier,
- for notifying the server of current state information for a current session between said browser and the server, and
- for notifying the server that the browser has ceased sending messages using said connection identifier; and wherein data transmission according to said out-of-band protocol comprises, in sequence: a header representing said transitional state message; a protocol identifier and a Content-Length header; a sequence of control characters; and an XML-encoded document containing said hash of said cache contents, said connection identifier and said browser state information.

* * * * *